United States Patent
Park

(10) Patent No.: US 11,151,935 B2
(45) Date of Patent: Oct. 19, 2021

(54) IMAGE DISPLAY DEVICE

(71) Applicant: LG ELECTRONICS INC., Seoul (KR)

(72) Inventor: Sungjin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/007,519

(22) Filed: Aug. 31, 2020

(65) Prior Publication Data

US 2021/0134217 A1 May 6, 2021

(30) Foreign Application Priority Data

Aug. 29, 2019 (KR) .................. 10-2019-0106853

(51) Int. Cl.
*G09G 3/3225* (2016.01)
*G09G 3/3233* (2016.01)
*G09G 3/3208* (2016.01)

(52) U.S. Cl.
CPC ... *G09G 3/3225* (2013.01); *G09G 2320/0233* (2013.01); *G09G 2360/16* (2013.01)

(58) Field of Classification Search
CPC ..... G09G 2320/0233; G09G 2320/062; G09G 2320/0653; G09G 2360/18
See application file for complete search history.

(56) References Cited

U.S. PATENT DOCUMENTS

| | | | | |
|---|---|---|---|---|
| 8,368,638 B2* | 2/2013 | Yun | ....................... | G09G 3/3406 345/102 |
| 2005/0184952 A1* | 8/2005 | Konno | ................ | G09G 3/3648 345/102 |
| 2010/0328535 A1* | 12/2010 | Okui | ..................... | G09G 3/3406 348/578 |
| 2014/0146066 A1* | 5/2014 | Kang | ................... | G09G 3/3225 345/545 |
| 2014/0160178 A1* | 6/2014 | Hong | ................... | G09G 3/2007 345/690 |

(Continued)

FOREIGN PATENT DOCUMENTS

| KR | 100843090 | 7/2008 |
|---|---|---|
| KR | 101024332 | 3/2011 |

(Continued)

OTHER PUBLICATIONS

PCT International Application No. PCT/KR2020/011522, International Search Report dated Dec. 24, 2020, 3 pages.

*Primary Examiner* — Sepehr Azari
(74) *Attorney, Agent, or Firm* — Lee, Hong, Degerman, Kang & Waimey

(57) ABSTRACT

An image display apparatus is disclosed. The image display apparatus includes a display including an organic light emitting diode panel and a controller configured to control the display, wherein the controller is configured to display a first input image, in the case in which a second image having higher luminance than the first image is input after the first image, increase the luminance of the second image during a first period, and decrease the luminance of the second image after the first period. Consequently, it is possible to prevent glare while preventing luminance decrease at the time of scene change of an input image.

20 Claims, 20 Drawing Sheets

(56) References Cited

U.S. PATENT DOCUMENTS

| | | | | |
|---|---|---|---|---|
| 2015/0054805 A1* | 2/2015 | Lee | ............ | G09G 5/10 345/207 |
| 2015/0325125 A1* | 11/2015 | Mochizuki | ....... | G08G 1/096783 340/905 |
| 2018/0090100 A1* | 3/2018 | Xu | ............ | G09G 3/2003 |

FOREIGN PATENT DOCUMENTS

| | | |
|---|---|---|
| KR | 1020120065683 | 6/2012 |
| KR | 1020170026909 | 3/2017 |

* cited by examiner

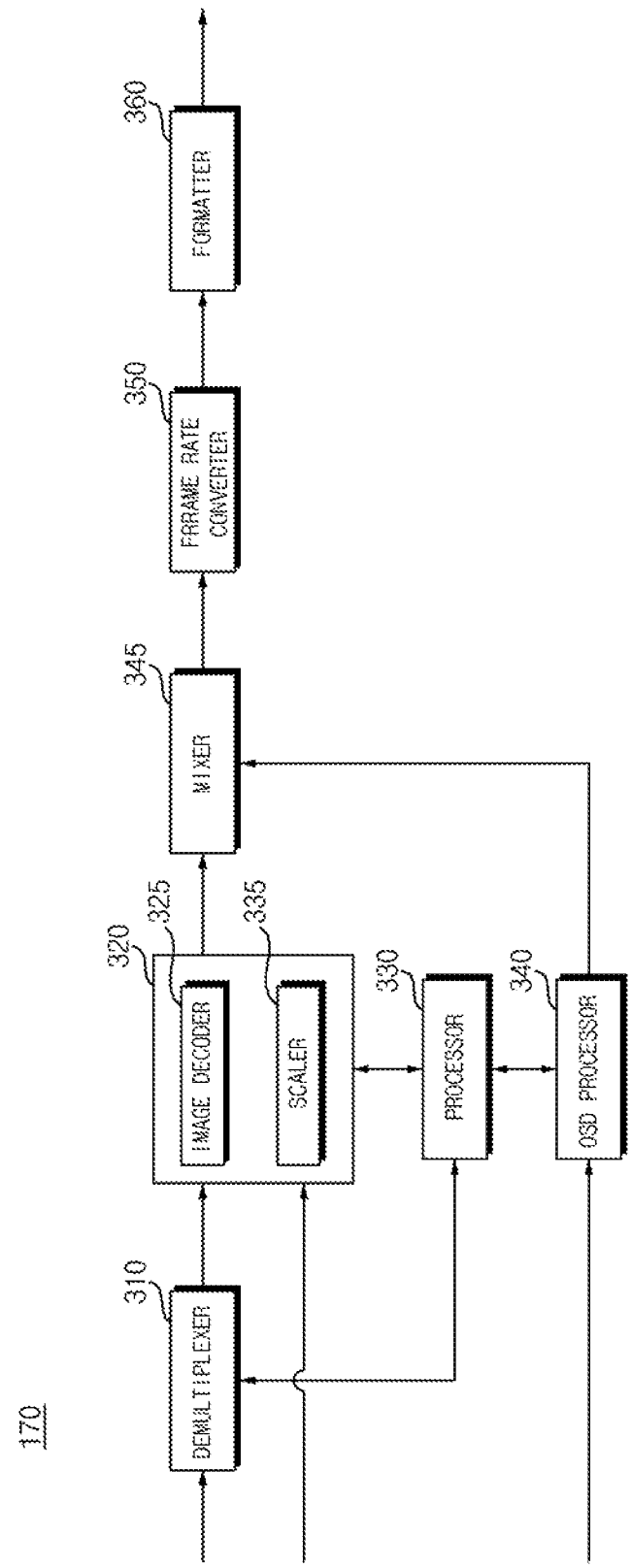

(a)　　　　　　　　(b)　　　　　　　　(c)

FIG. 7A
(a) 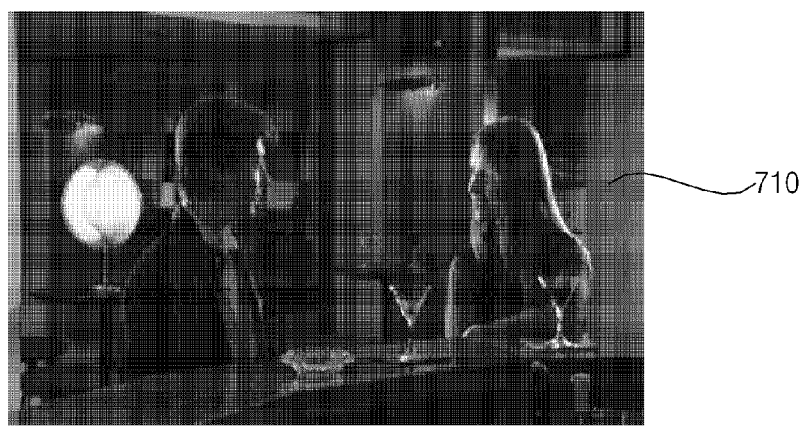
(b) 

IMAGE DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2019-0106853, filed on Aug. 29, 2020, the contents of which are hereby incorporated by reference herein in its entirety.

BACKGROUND OF THE DISCLOSURE

1. Field of the Disclosure

The present disclosure relates to an image display apparatus, and more particularly to an image display apparatus capable of preventing glare while preventing luminance decrease at the time of scene change of an input image.

2. Related Art

An image display apparatus is an apparatus including a function of providing an image that a user can watch. The user can watch various images through the image display apparatus.

Meanwhile, in the case in which an organic light emitting diode panel is used in the image display apparatus, technology for changing luminance based on the average picture level (APL) of the input image is used.

For example, a dark input image is displayed at the maximum luminance, and the luminance of a bright image is lowered.

In the case in which this scheme is applied, however, luminance is lowered when the bright image is displayed, whereby the image is visually darkened.

SUMMARY OF THE DISCLOSURE

An object of the present disclosure is to provide an image display apparatus capable of preventing glare while preventing luminance decrease at the time of scene change of an input image.

In accordance with an aspect of the present disclosure, the above and other objects can be accomplished by the provision of an image display apparatus including a display including an organic light emitting diode panel and a controller configured to control the display, wherein the controller is configured to display a first input image, in the case in which a second image having higher luminance than the first image is input after the first image, increase the luminance of the second image during a first period, and decrease the luminance of the second image after the first period.

Meanwhile, in the case in which the luminance difference between the second image and the first image is equal to or greater than a predetermined value, the controller may increase the luminance of the second image from a first level to a second level during the first period, may maintain the luminance of the second image at the second level during a second period after the first period, and may decrease the luminance of the second image from the second level to a third level during a third period after the second period.

Meanwhile, the controller may maintain the luminance of the second image at the third level during a fourth period after the third period, and may increase the luminance of the second image from the third level during a fifth period after the fourth period.

Meanwhile, the controller may perform control such that a luminance change rate at the time of luminance decrease of the second image is lower than a luminance change rate at the time of luminance increase of the second image.

Meanwhile, the third period may be longer than the first period.

Meanwhile, the second period may be longer than the first period.

Meanwhile, the controller may calculate the average picture level (APL) of an input image, and may change the luminance of the input image based on the average picture level.

Meanwhile, in the case in which the average picture level is equal to or higher than a reference level, the controller may decrease the luminance of the input image, as the average picture level increases.

Meanwhile, the controller may perform luminance conversion based on a first conversion table according to the average picture level of an input image, may perform luminance conversion based on a second conversion table having higher conversion luminance than the first conversion table during the first period when luminance is increased at the time of scene change between the first image and the second image, and may perform luminance conversion based on a third conversion table having lower conversion luminance than the first conversion table at the time of luminance decrease.

Meanwhile, in the case in which a third image having higher luminance than the first image and higher luminance than the second image is input after the first image, the controller may increase the luminance of the third image during the first period and may decrease the luminance of the third image after the first period.

Meanwhile, in the case in which a luminance difference between the third image and the first image is equal to or greater than a predetermined value, the controller may increase the luminance of the third image from a fourth level to a fifth level during the first period, may maintain the luminance of the third image at the fifth level during a second period after the first period, and may decrease the luminance of the third image from the fifth level to a sixth level during a third period after the second period.

Meanwhile, the controller may maintain the luminance of the third image at the sixth level during a fourth period after the third period, and may increase the luminance of the third image from the sixth level during a fifth period after the fourth period.

Meanwhile, the controller may include an image switching detector configured to detect image switching of an input image and a luminance adjustment calculator configured to perform luminance adjustment calculation at the time of detection of image switching by the image switching detector.

Meanwhile, the display may include a luminance adjuster configured to adjust luminance based on a luminance adjustment signal from the luminance adjustment calculator, and in the case in which a second image having higher luminance than the first image is input after the first image, the luminance adjuster may increase the luminance of the second image during the first period and may decrease the luminance of the second image after the first period.

Meanwhile, the controller may include a filter configured to filter the input image in the case in which no image switching is detected by the image switching detector and an output interface configured to receive and output a signal from the image switching detector and a signal from the filter.

In accordance with another aspect of the present disclosure, there is provided an image display apparatus including a display including an organic light emitting diode panel and a controller configured to control the display, wherein the controller is configured to display a first input image, in the case in which the luminance difference between the first image and a second image input after the first image is equal to or greater than a predetermined value, increases the luminance of the second image during a first period, and decreases the luminance of the second image after the first period.

Meanwhile, the controller may increase the luminance of the second image from a first level to a second level during the first period, may maintain the luminance of the second image at the second level during a second period after the first period, and may decrease the luminance of the second image from the second level to a third level during a third period after the second period.

In accordance with a further aspect of the present disclosure, there is provided an image display apparatus including a display including an organic light emitting diode panel and a controller configured to control the display, wherein the controller is configured to display a first input image, insert a predetermined pattern into a second image input after the first image, in the case in which the luminance of the second image is higher than the luminance of the first image, increases the luminance of the pattern in the second image during a first period, and decreases the luminance of the pattern in the second image after the first period.

Meanwhile, in the case in which the luminance difference between the second image and the first image is equal to or greater than a predetermined value, the controller may increase the luminance of the pattern in the second image from a first level to a second level during the first period, may maintain the luminance of the pattern in the second image at the second level during a second period after the first period, and may decrease the luminance of the pattern in the second image from the second level to a third level during a third period after the second period.

Meanwhile, the controller may maintain the luminance of the pattern in the second image at the third level during a fourth period after the third period, and may increase the luminance of the pattern in the second image from the third level during a fifth period after the fourth period.

BRIEF DESCRIPTION OF THE DRAWINGS

The embodiments will be described in detail with reference to the following drawings in which like reference numerals refer to like elements wherein:

FIG. 3 is an example of an internal block diagram of a controller of FIG. 2;

FIG. 7A is a diagram illustrating examples of a dark image and a bright image;

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
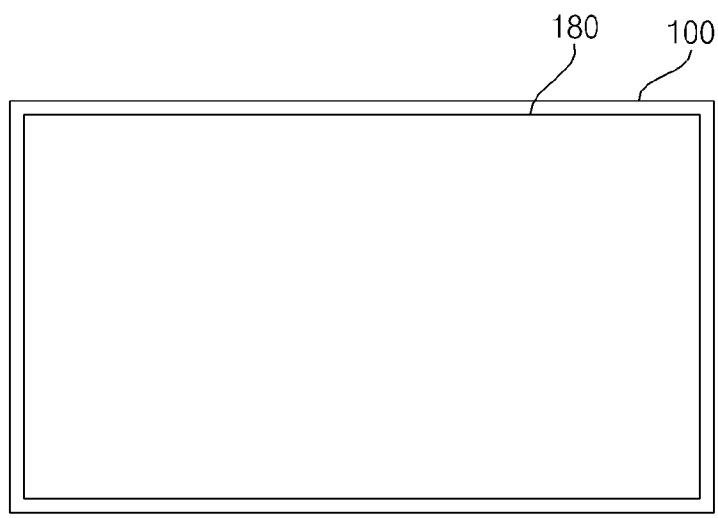
FIG. 1 is a diagram illustrating an image display apparatus according to an embodiment of the present disclosure.

FIG. 1 is a diagram illustrating an image display apparatus according to an embodiment of the present disclosure.

Referring to the drawing, an image display apparatus 100 may include a display 180.

Meanwhile, the display 180 may be implemented with any one of various panels. For example, the display 180 may be any one of a liquid crystal display panel (LCD panel), an organic light emitting diode panel (OLED panel), and an inorganic light emitting diode panel (LED panel).

Meanwhile, a description of an example in which the display 180 includes an OLED panel will hereinafter be provided.

An image display apparatus 100 according to an embodiment of the present disclosure may include a display 180 including an organic light emitting diode panel 210 and a controller 170 configured to control the display 180, wherein the controller 170 may perform control such that a first input image 710 is displayed, in the case in which a second image 720 having higher luminance than the first image 710 is input after the first image 710, may increase the luminance of the second image 720 during a first period Pra, and may decrease the luminance of the second image 720 after the first period Pra. Consequently, it is possible to prevent luminance decrease at the time of scene change of the input image during the first period Pra and to decrease the luminance of the second image 720 after the first period Pra, thereby preventing glare.

Particularly, in the case in which the luminance difference between the second image 720 and the first image 710 is equal to or greater than a predetermined value, the controller 170 may increase the luminance of the second image 720 from a first level Lv1 to a second level Lv2 during the first period Pra, may maintain the luminance of the second image 720 at the second level Lv2 during a second period Prsa after the first period Pra, and may decrease the luminance of the second image 720 from the second level Lv2 to a third level Lv3 during a third period Pfa after the second period Prsa. Consequently, it is possible to prevent luminance decrease at the time of scene change of the input image during the first period Pra and to decrease the luminance of the second image 720 during the third period Pfa, thereby preventing glare.

Meanwhile, an image display apparatus 100 according to another embodiment of the present disclosure may include a display 180 including an organic light emitting diode panel 210 and a controller 170 configured to control the display 180, wherein the controller 170 may be configured to display a first input image 710, in the case in which the luminance difference between the first image 710 and a second image 720 input after the first image 710 is equal to or greater than a predetermined value, may increase the luminance of the second image 720 during a first period Pra, and may decrease the luminance of the second image 720 after the first period Pra. Consequently, it is possible to prevent luminance decrease at the time of scene change of the input image during the first period Pra and to decrease the luminance of the second image 720 after the first period Pra, thereby preventing glare.

Meanwhile, an image display apparatus 100 according to a further embodiment of the present disclosure may include a display 180 including an organic light emitting diode panel 210 and a controller 170 configured to control the display 180, wherein the controller 170 may be configured to display a first input image 710, may insert a predetermined pattern into a second image 720 input after the first image 710, in the case in which the luminance of the second image 720 is higher than the luminance of the first image 710, may increase the luminance of the pattern in the second image 720 during a first period Pra, and may decrease the luminance of the pattern in the second image 720 after the first period Pra. Consequently, it is possible to prevent luminance decrease at the time of scene change of the input image during the first period Pra and to decrease the luminance of the second image 720 after the first period Pra, thereby preventing glare.

Various operation methods of the image display apparatus 100 according to the embodiment of the present disclosure will be described in more detail with reference to FIG. 8.

Meanwhile, the image display apparatus 100 of FIG. 1 may be a TV, a monitor, a tablet PC, a mobile terminal, a display for a vehicle, or the like.

Figure 2:
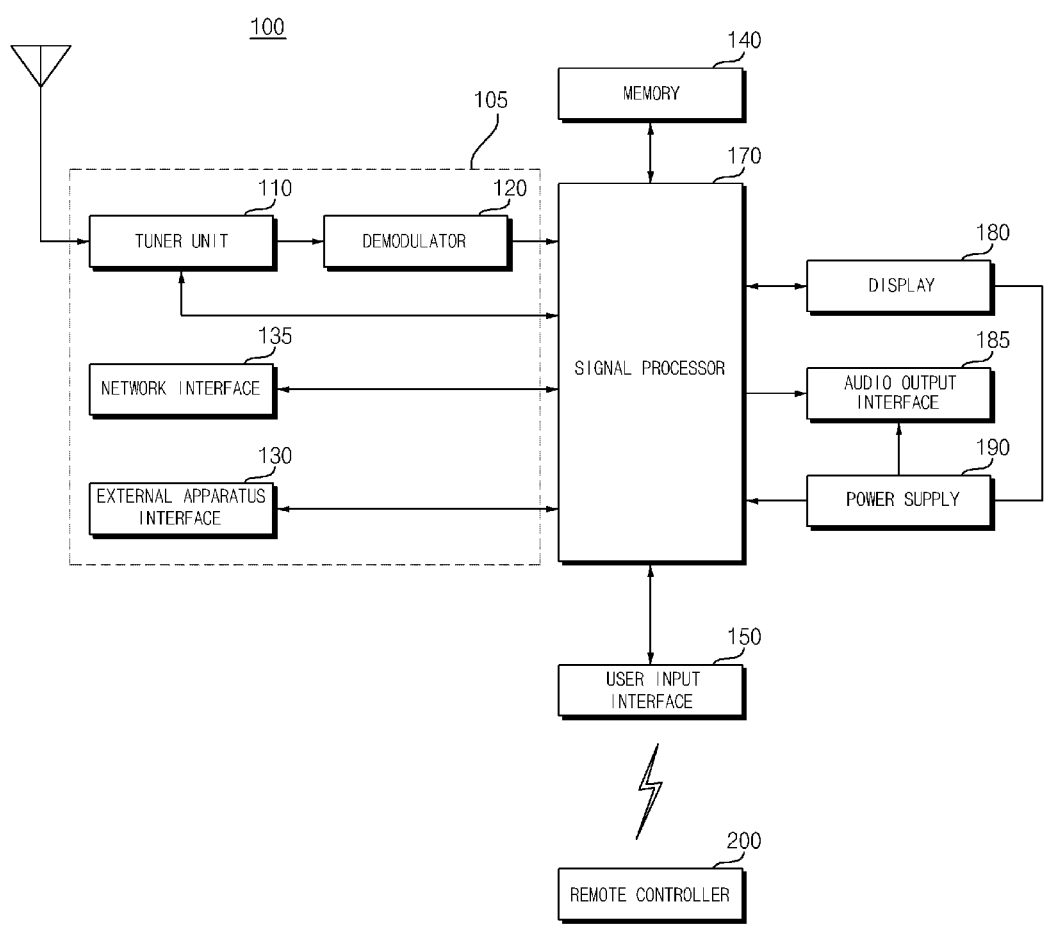
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes a broadcast receiver 105, a memory 140, a user input interface 150, a sensor unit (not shown), a controller 170, a display 180, and an audio output interface 185.

The broadcast receiver 105 may include a tuner unit 110, a demodulator 120, a network interface 135, and an external apparatus interface 130.

Meanwhile, unlike the drawing, the broadcast receiver 105 may include only the tuner unit 110, the demodulator 120, and the external apparatus interface 130. That is, the network interface 135 may not be included.

The tuner unit 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner unit 110 can process a digital broadcast signal or an analog broadcast signal. The analog baseband image or audio signal (CVBS/SIF) output from the tuner unit 110 may be directly input to the controller 170.

Meanwhile, the tuner unit 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner unit 110 and performs a demodulation operation.

The demodulator 120 may perform demodulation and channel decoding and then output a stream signal TS. At this time, the stream signal may be a multiplexed signal of an image signal, a audio signal, or a data signal.

The stream signal output from the demodulator 120 may be input to the controller 170. The controller 170 performs demultiplexing, image/audio signal processing, and the like, and then outputs an image to the display 180 and outputs audio to the audio output interface 185.

The external apparatus interface 130 may transmit or receive data with a connected external apparatus (not shown), e.g., a set-top box 50. To this end, the external apparatus interface 130 may include an A/V input and output interface (not shown).

The external apparatus interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output interface may receive image and audio signals from an external apparatus. Meanwhile, a wireless communicator (not shown) may perform short-range wireless communication with other electronic apparatus.

Through the wireless communicator (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the controller 170, and may store signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the controller 170, the scope of the present disclosure is not limited thereto. The memory 140 may be included in the controller 170.

The user input interface 150 transmits a signal input by the user to the controller 170 or transmits a signal from the controller 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the controller 170, may transfer a user input signal input from a sensor unit (not shown) that senses a user's gesture to the controller 170, or may transmit a signal from the controller 170 to the sensor unit (not shown).

The controller 170 may demultiplex the input stream through the tuner unit 110, the demodulator 120, the network interface 135, or the external apparatus interface 130, or process the demultiplexed signals to generate and output a signal for image or audio output.

The image signal processed by the controller 170 is input to the display 180, and may be displayed as an image corresponding to the image signal. In addition, the image signal processed by the controller 170 may be input to the external output apparatus through the external apparatus interface 130.

The audio signal processed by the controller 170 may be output to the audio output interface 185 as an audio signal. In addition, audio signal processed by the controller 170 may be input to the external output apparatus through the external apparatus interface 130.

Although not shown in FIG. 2, the controller 170 may include a demultiplexer, an image processor, and the like. This will be described later with reference to FIG. 3.

In addition, the controller 170 can control the overall operation of the image display apparatus 100. For example, the controller 170 may control the tuner unit 110 to control the tuning of the RF broadcast corresponding to the channel selected by the user or the previously stored channel.

In addition, the controller 170 may control the image display apparatus 100 according to a user command input through the user input interface 150 or an internal program.

Meanwhile, the controller 170 may control the display 180 to display an image. At this time, the image displayed on the display 180 may be a still image or a moving image, and may be a 2D image or a 3D image.

Meanwhile, the controller 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the controller 170 may recognize the position of the user based on the image photographed by a photographing unit (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the controller 170, an image signal, a data signal, a control signal, and the like received from the external apparatus interface 130.

Meanwhile, the display 180 may be configured as a touch screen and used as an input device in addition to an output device.

The audio output interface 185 receives a signal processed by the controller 170 and outputs it as an audio.

The photographing unit (not shown) photographs a user. The photographing unit (not shown) may be implemented by a single camera, but the present disclosure is not limited thereto and may be implemented by a plurality of cameras. Image information photographed by the photographing unit (not shown) may be input to the controller 170.

The controller 170 may sense a gesture of the user based on each of the images photographed by the photographing unit (not shown), the signals detected from the sensor unit (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output interface 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

FIG. 3 is an example of an internal block diagram of a controller of FIG. 2.

Referring to the drawing, the controller 170 according to an embodiment of the present disclosure may include a demultiplexer 310, an image processor 320, a processor 330, an OSD generator 340, a mixer 345, a frame rate converter 350, and a formatter 360. In addition, it may further include an audio processor (not shown), and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner unit 110, the demodulator 120, or the external apparatus interface 130.

The image processor 320 may perform image processing of the demultiplexed image signal. To this end, the image processor 320 may include an image decoder 325 and a scaler 335.

The image decoder 325 decodes the demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a multiple view image may be provided.

The processor 330 may control the overall operation of the image display apparatus 100 or the controller 170. For example, the processor 330 may control the tuner 110 to accomplish the tuning of an RF broadcast corresponding to a channel selected by the user or a previously stored channel.

In addition, the processor 330 may control the image display apparatus 100 by a user command input through the user input interface 150 or an internal program.

In addition, the processor 330 may perform a control of data transmission with the network interface 135 or the external apparatus interface 130.

In addition, the processor 330 may control operations of the demultiplexer 310, the image processor 320, the OSD generator 340, and the like in the controller 170.

The OSD generator 340 generates an OSD signal according to a user input or by itself. For example, based on a user input signal, the OSD generator 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD generator 340 may generate a pointer that can be displayed on the display, based on a pointing signal input from the remote controller 200. In particular, such a pointer may be generated by a pointing signal processor, and the OSD generator 340 may include such a pointing signal processor (not shown). Obviously, the pointing signal processor (not shown) may be provided separately from the OSD generator 340.

The mixer 345 may mix an OSD signal generated by the OSD generator 340 with a decoded image signal image-processed by the image processor 320. The mixed image signal is supplied to the frame rate converter 350.

The frame rate converter (FRC) 350 may convert the frame rate of an input image. Meanwhile, the frame rate converter 350 can also directly output the frame rate without any additional frame rate conversion.

Meanwhile, the formatter 360 may convert the format of an input image signal into a image signal for display on the display and output it.

The formatter 360 may change the format of the image signal. For example, it may change the format of the 3D image signal into any one of various 3D formats such as a side by side format, a top/down format, a frame sequential format, an interlaced format, a checker box format, and the like.

Meanwhile, the audio processor (not shown) in the controller 170 may perform the audio processing of the demultiplexed audio signal. To this end, the audio processor (not shown) may include various decoders.

In addition, the audio processor (not shown) in the controller 170 may process a base, a treble, a volume control, and the like.

The data processor (not shown) in the controller 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the controller 170 shown in FIG. 3 is a block diagram for an embodiment of the present disclosure. Each component of the block diagram may be integrated, added, or omitted according to a specification of the controller 170 actually implemented.

In particular, the frame rate converter 350 and the formatter 360 may not be provided in the controller 170, but may be separately provided or may be provided as a separate single module.

Figure 4A:
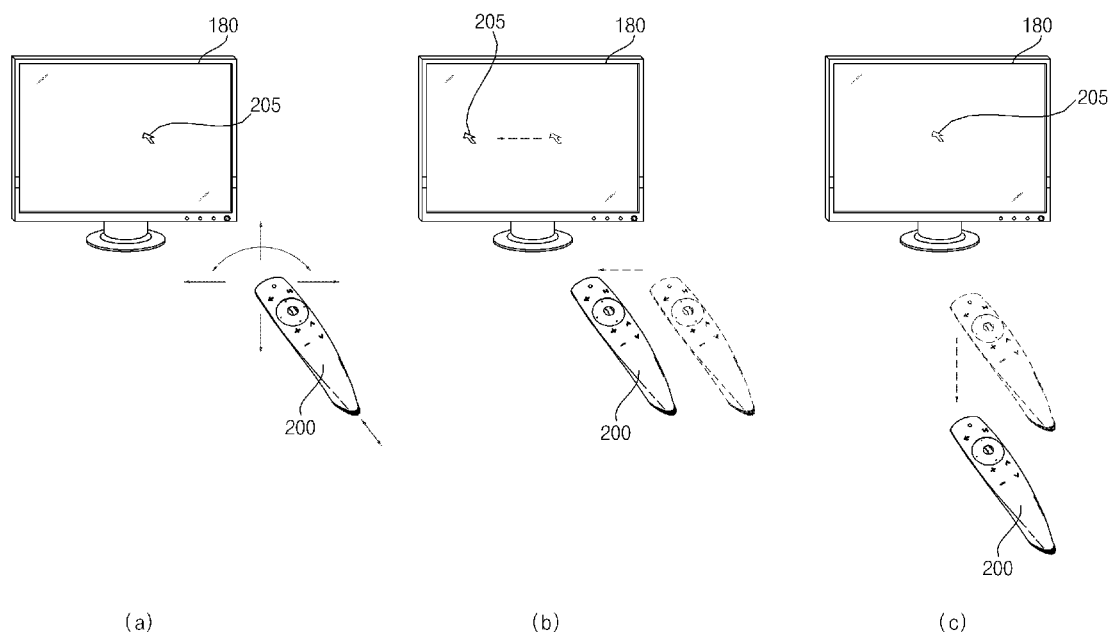
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
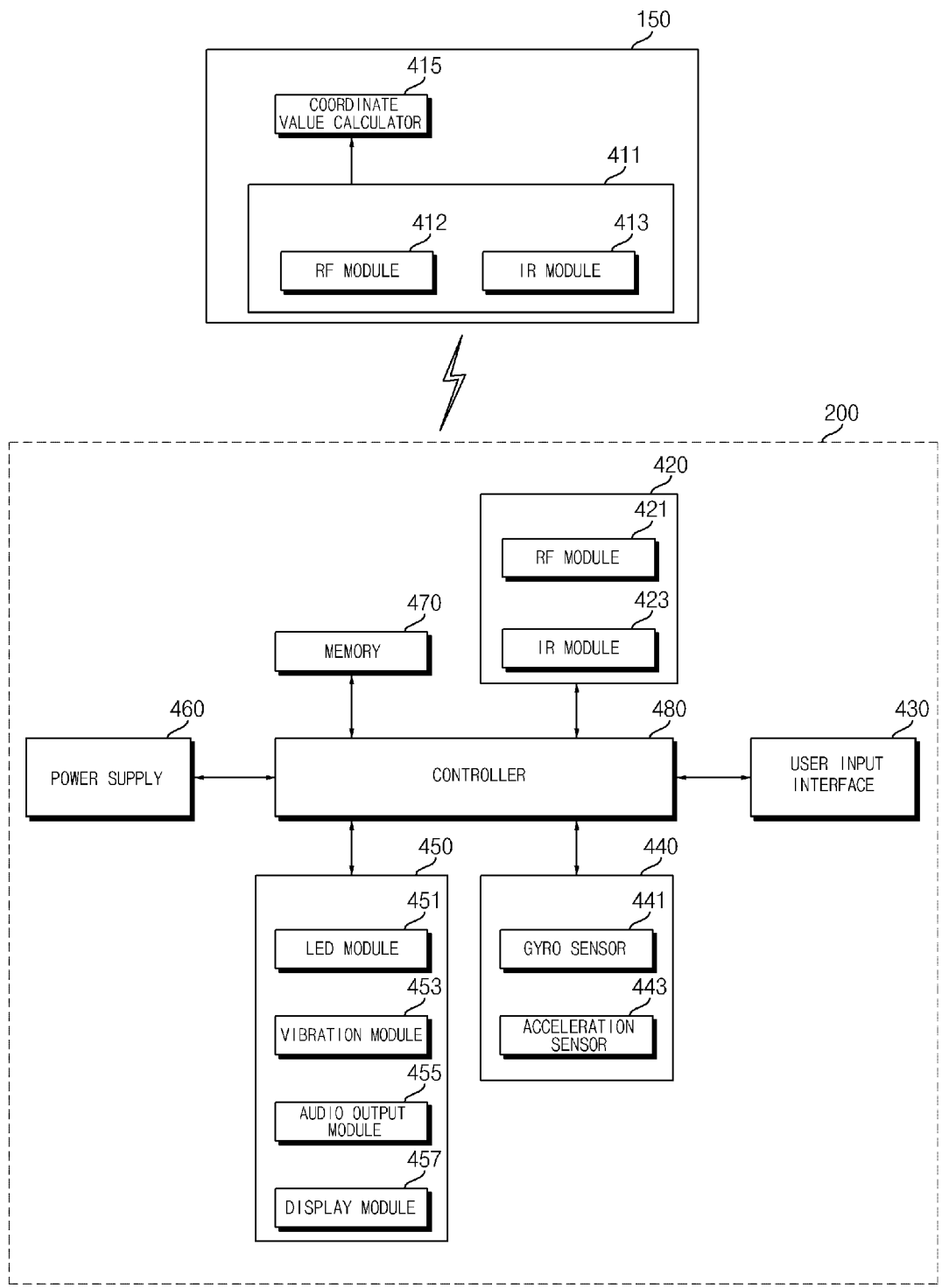
FIG. 4B is an internal block diagram of the remote controller of FIG. 2.

FIG. 4B is an internal block diagram of the remote controller of FIG. 2.

Referring to the drawing, the remote controller 200 includes a wireless communicator 425, a user input interface 435, a sensor unit 440, an output interface 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input interface 435 may be implemented by a keypad, a button, a touch pad, a touch screen, or the like. The user may operate the user input interface 435 to input a command related to the image display apparatus 100 to the remote controller 200. When the user input interface 435 includes a hard key button, the user can input a command related to the image display apparatus 100 to the remote controller 200 through a push operation of the hard key button. When the user input interface 435 includes a touch screen, the user may touch a soft key of the touch screen to input the command related to the image display apparatus 100 to the remote controller 200. In addition, the user input interface 435 may include various types of input means such as a scroll key, a jog key, etc., which can be operated by the user, and the present disclosure does not limit the scope of the present disclosure.

The sensor unit 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output interface 450 may output an image or an audio signal corresponding to the operation of the user input interface 435 or a signal transmitted from the image display apparatus 100. Through the output interface 450, the user may recognize whether the user input interface 435 is operated or whether the image display apparatus 100 is controlled.

For example, the output interface 450 may include an LED module 451 that is turned on when the user input interface 435 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input interface 435 or a signal corresponding to the motion of the remote controller 200 sensed by the sensor unit 440 to the image display apparatus 100 through the wireless communicator 425.

The user input interface 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communicator 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the controller 170, not in the user input interface 150.

Figure 5:
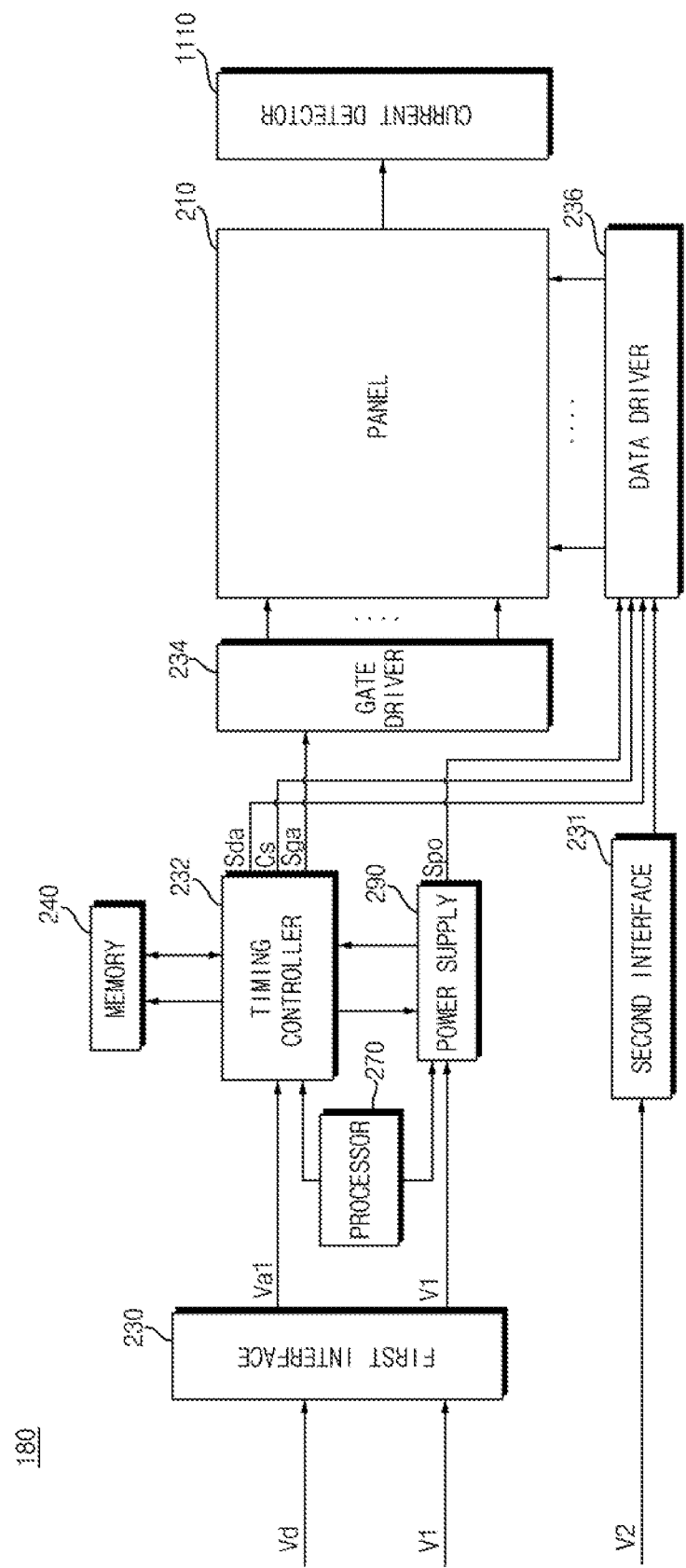
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 1110, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the controller 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the controller 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 1110 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 1110.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or greater than 300000 A, the processor 270 may determine that a corresponding subpixel is a subpixel which has been burn in.

Meanwhile, if accumulated current of some of subpixels of the OLED panel 210 is close to the allowable value, the processor 270 may determine that the corresponding subpixel is a subpixel expected to be burn in.

Meanwhile, based on a current detected by the current detector 1110, the processor 270 may determine that a subpixel including the greatest accumulated current is an expected burn-in subpixel.

Meanwhile, the processor 270 may calculate a burn-in subpixel or an expected burn-in subpixel in the OLED panel 210 based on a current detected by the current detector 1110, and then the processor 270 may perform control such that a current lower than an allocated current flows in a subpixel in the surroundings of the burn-in subpixel or the expected burn-in subpixel. Accordingly, it is possible to extend the burn-in phenomenon of the subpixel in the surroundings of the burn-in subpixel. As a result, this may extend the lifetime of the image display apparatus 100 including the OLED panel 210.

Meanwhile, the processor 270 may perform control such that a current higher than an allocated current flows in the calculated burn-in subpixel, and, as a result, a low current flows in the surroundings of the calculated burn-in subpixel, thereby preventing illuminance decrease.

Meanwhile, if burn-in does not happen in the OLED panel 210, the processor 270 may perform control such that a current lower than an allocated current flows in a subpixel in the surroundings of an expected burn-in subpixel, so that burn-in may last further in the subpixel in the surroundings of the expected burn-in subpixel. As a result, the life of the image display apparatus 100 including the OLED panel 210 may increase.

Meanwhile, the processor 270 may perform control such that a data voltage lower than an allocated data voltage is applied to a subpixel in the surroundings of the calculated burn-in subpixel or the expected burn-in subpixel.

Meanwhile, if burn-in does not happen in the OLED panel 210, the processor 270 may perform control such that a current lower than an allocated current flows even in the expected burn-in subpixel, so that the burn-in may last further in the burn-in expected subpixel. As a result, the life time of the image display apparatus 100 including the OLED panel 210 may increase.

Meanwhile, the processor 270 may perform control such that a current of a second level higher than a first level flows in a second subpixel farther than a first subpixel among subpixels in the surroundings of a calculated burn-in subpixel or a calculated expected burn-in subpixel. Accordingly, a higher current may flow in the second subpixel expected to have a longer lifetime, and therefore, it is possible to prevent luminance decrease.

Meanwhile, the processor 270 may calculate a subpixel including the greatest accumulated current in the OLED panel 210 based on a current detected by the current detector 1110, and perform control such that a current lower than an allocated current flows in subpixels in the surroundings of the subpixel including the greatest accumulated current. Accordingly, it is possible to extend the entire life time of the image display apparatus 100 including the OLED panel 210.

Meanwhile, the processor 270 may perform control such that a current of a lower level flows in subpixels in the surroundings of a subpixel including the greatest accumulated current. Accordingly, it is possible to extend the overall lifetime of the image display apparatus 100 including the OLED panel 210.

Figure 6A:
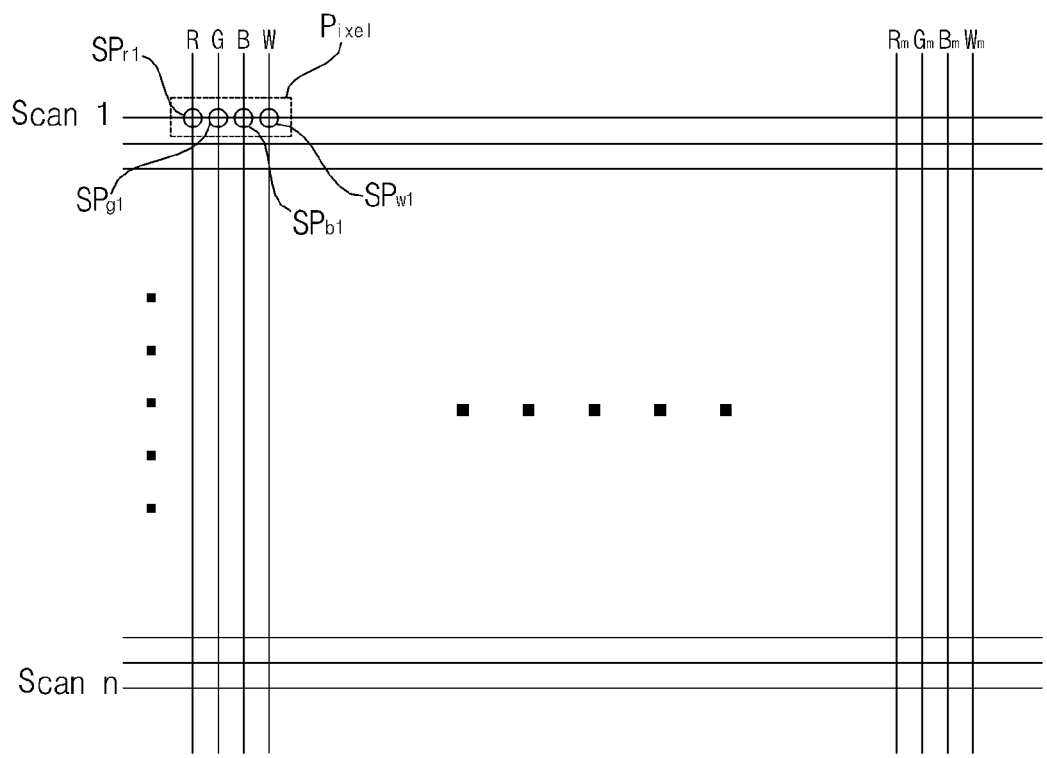
FIG. 6A and FIG. 6B are diagrams referred to in the description of an organic light emitting diode panel of FIG. 5.
Figure 6B:
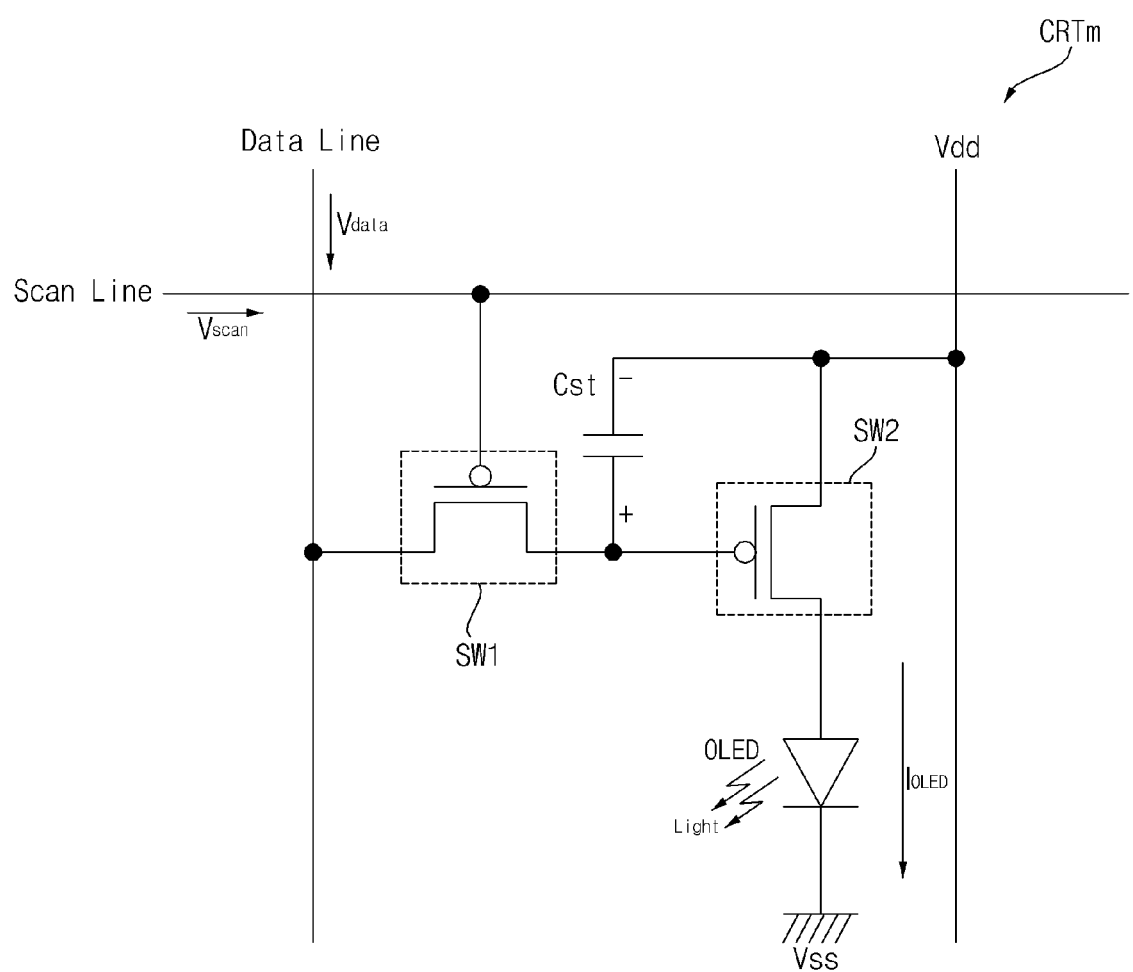

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan 1 to Scan n and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRT) may include, as an active type, a switching transistor SW1, a storage capacitor Cst, a drive transistor SW2, and an organic light emitting layer (OLED).

Referring to drawing, an organic light emitting sub pixel circuit (CRT) may include, as an active type, a switching transistor SW1, a storage capacitor Cst, a drive transistor SW2, and an organic light emitting layer (OLED).

The storage capacitor Cst is formed between the gate terminal and the source terminal of the drive transistor SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst varies according to the level difference of the data signal Vdata.

For another example, when the data signal has a different pulse width according to a Pulse Width Modulation (PWM) method, the power level stored in the storage capacitor Cst varies according to the pulse width difference of the data signal Vdata.

The drive transistor SW2 is turned on according to the power level stored in the storage capacitor Cst. When the drive transistor SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a switching transistor SW1 and a drive transistor SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Meanwhile, currents flow in the OLED disposed at each subpixel shown in FIG. 6D, thereby emitting light.

FIG. 7A is a diagram illustrating examples of a dark image and a bright image.

Referring to the figure, the average picture level (APL) of the dark image 710 is low, and the average picture level (APL) of the bright image 720 is high.

Figure 7B:
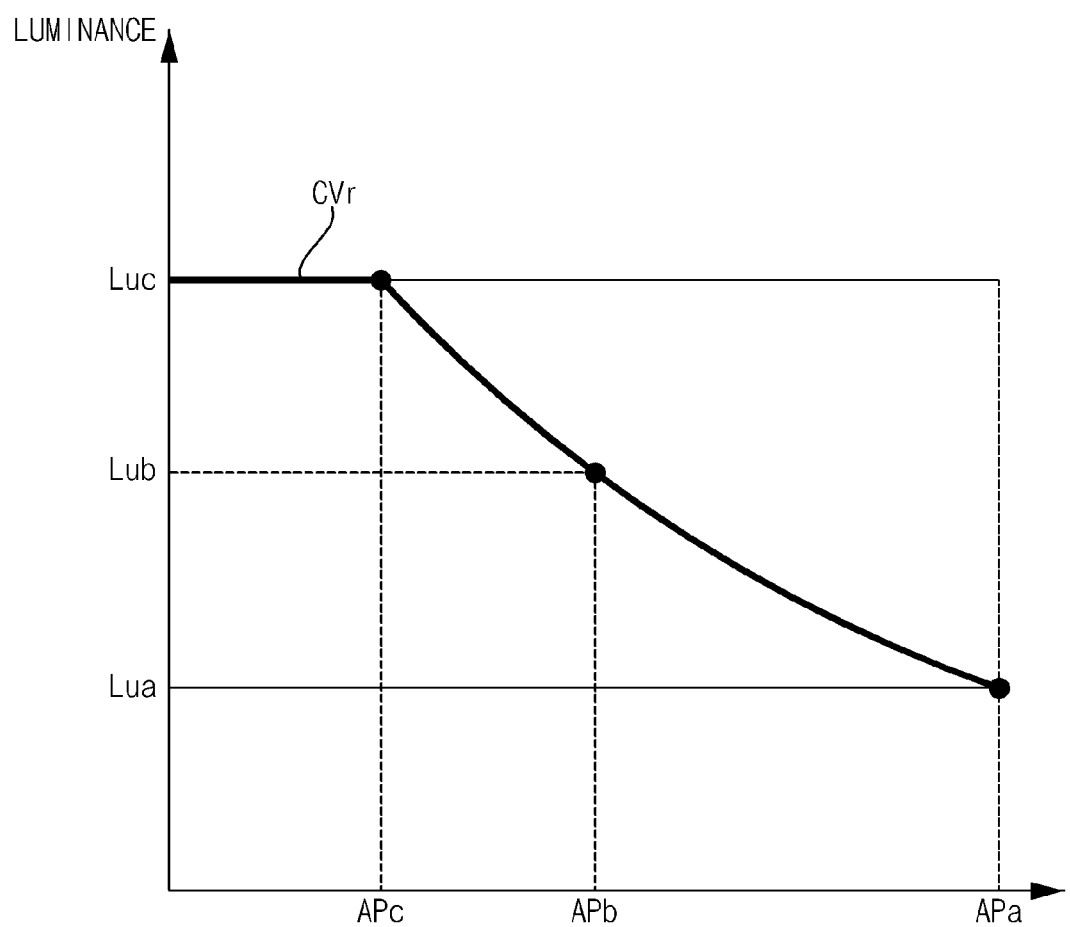
FIG. 7B is a diagram illustrating an example of a luminance conversion curve based on the average picture level.

FIG. 7B is a diagram illustrating an example of a luminance conversion curve based on the average picture level.

Referring to the figure, an organic light emitting diode panel 210 has the characteristics of a self-emissive panel, unlike a liquid crystal panel. In the case in which the average picture level is equal to or higher than a reference level, control may decrease the luminance of an input image, as the average picture level increases in order to improve contrast.

That is, in the case in which the average picture level (APL) is equal to or higher than a reference level APc, the controller 170 may decrease the luminance of an input image, as the average picture level increases. Consequently, it is possible to improve contrast.

The figure illustrates that conversion to the maximum luminance Luc is performed in the case in which the average picture level (APL) is lower than the reference level APc and the luminance of an input image decreases as the average picture level increases in the case in which the average picture level (APL) is equal to or higher than the reference level APc.

In the case in which this scheme is applied, however, luminance is lowered when the bright image is displayed, whereby the image is visually darkened.

Therefore, the present disclosure proposes a scheme for preventing glare while preventing luminance decrease at the time of scene change of an input image, which will be described hereinafter with reference to FIG. 8.

Figure 8:
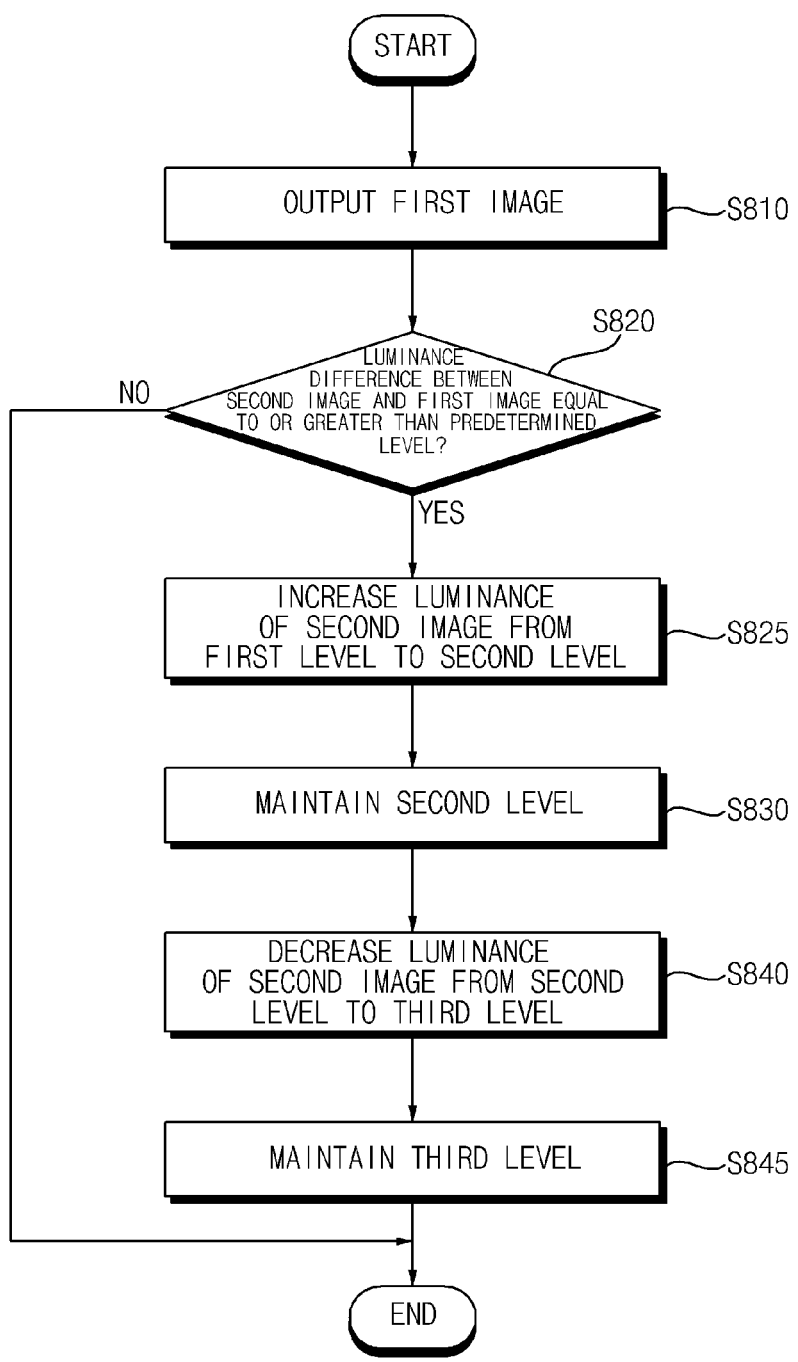
FIG. 8 is a flowchart showing an example of a method of operating an image display apparatus according to an embodiment of the present disclosure.

FIG. 8 is a flowchart showing an example of a method of operating an image display apparatus according to an embodiment of the present disclosure, and FIGS. 9 to 14C are diagrams referred to in description of the method shown in FIG. 8.

Referring first to FIG. 8, the controller 170 performs signal processing with respect to a first input image, and the display 180 displays the first image (S810).

The first image may be the image 710 of FIG. 7A.

The controller 170 may calculate the average picture level of the first image, and in the case in which the average picture level is lower than a reference level APc, may perform signal processing such that the luminance of the first image 710 is the maximum level Luc according to the luminance conversion curve CVr of FIG. 7B, and may be configured to display the image.

Subsequently, the controller 170 determines whether the luminance difference between a second image and the first image is equal to or greater than a predetermined level (S820).

For example, in the case in which the luminance difference between the second image and the first image is equal to or higher than the predetermined level, the controller 170 may determine that scene change has been performed.

Particularly, in the case in which the luminance difference between the second image and the first image is equal to or greater than the predetermined level and the luminance of the second image is higher than the luminance of the first image, the controller 170 may determine that scene change has been performed and may perform control such that step S825 and subsequent steps are performed.

Here, the luminance of the first image and the luminance of the second image may correspond to the average picture level of the first image and the average picture level of the second image, respectively.

That is, in the case in which the difference between the average picture level of the second image and the average picture level of the first image is equal to or greater than the predetermined level and the average picture level of the second image is higher than the average picture level of the first image, the controller 170 may determine that scene change has been performed and may perform control such that step S825 and subsequent steps are performed.

Also, in the case in which the luminance difference between the second image and the first image is equal to or greater than the predetermined level, the controller 170 may increase the luminance of the second image from a first level to a second level during a first period (S825). Consequently, it is possible to prevent luminance decrease at the time of scene change of the input image during the first period.

In addition, the controller 170 may maintain the luminance of the second image at the second level during a second period after the first period. Consequently, it is possible to prevent luminance decrease at the time of scene change of the input image.

In addition, the controller 170 may decrease the luminance of the second image from the second level to a third level during a third period after the second period (S840). Consequently, it is possible to prevent glare due to luminance increase.

In addition, the controller 170 may maintain the luminance of the second image at the third level during a fourth period after the third period (S845). Consequently, it is possible to prevent glare due to luminance increase.

In addition, the controller 170 may increase the luminance of the second image from the third level to the second level during a fifth period after the fourth period. Consequently, it is possible to eliminate the total luminance change amount during the predetermined period.

Figure 9:
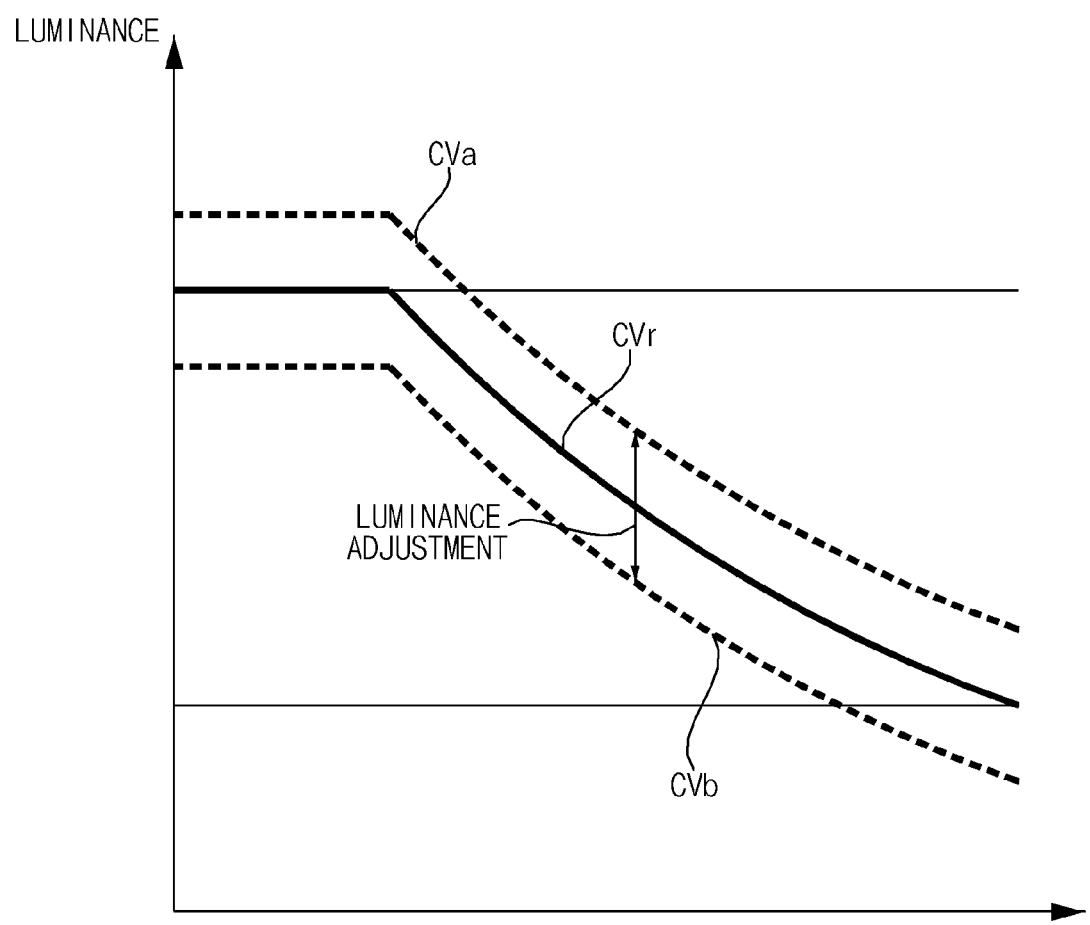
FIGS. 9 to 14C are diagrams referred to in description of the method shown in FIG. 8.

FIG. 9 is a diagram illustrating various luminance conversion curves according to an embodiment of the present disclosure.

Referring to the figure, Cvr of FIG. 9 corresponds to the luminance conversion curve of FIG. 7B.

Meanwhile, in the present disclosure, various luminance conversion curves are applied to prevent luminance decrease at the time of scene change.

The figure illustrates a second luminance conversion curve CVa having a higher luminance level than the first luminance conversion curve CVr and a third luminance conversion curve CVb having a lower luminance level than the first luminance conversion curve CVr.

For example, in the case in which the luminance level is increased as in step S825, luminance may be increased according to the second luminance conversion curve CVa, rather than the first luminance conversion curve CVr.

That is, the controller 170 may perform luminance conversion based on a first conversion table according to the average picture level of the input image, and may perform luminance conversion based on a second conversion table corresponding to the second luminance conversion curve CVa having higher conversion luminance than the first conversion table corresponding to the first luminance conversion curve CVr during the first period Pra when luminance is increased at the time of scene change between the first image 710 and the second image 720.

As another example, in the case in which the luminance level is decreased as in step S840, luminance may be decreased according to the third luminance conversion curve CVb, rather than the first luminance conversion curve CVr.

That is, when luminance is lowered, the controller 170 may perform luminance conversion based on a third conversion table having lower conversion luminance than the first conversion table. Consequently, it is possible to prevent luminance decrease at the time of scene change.

Figure 10:
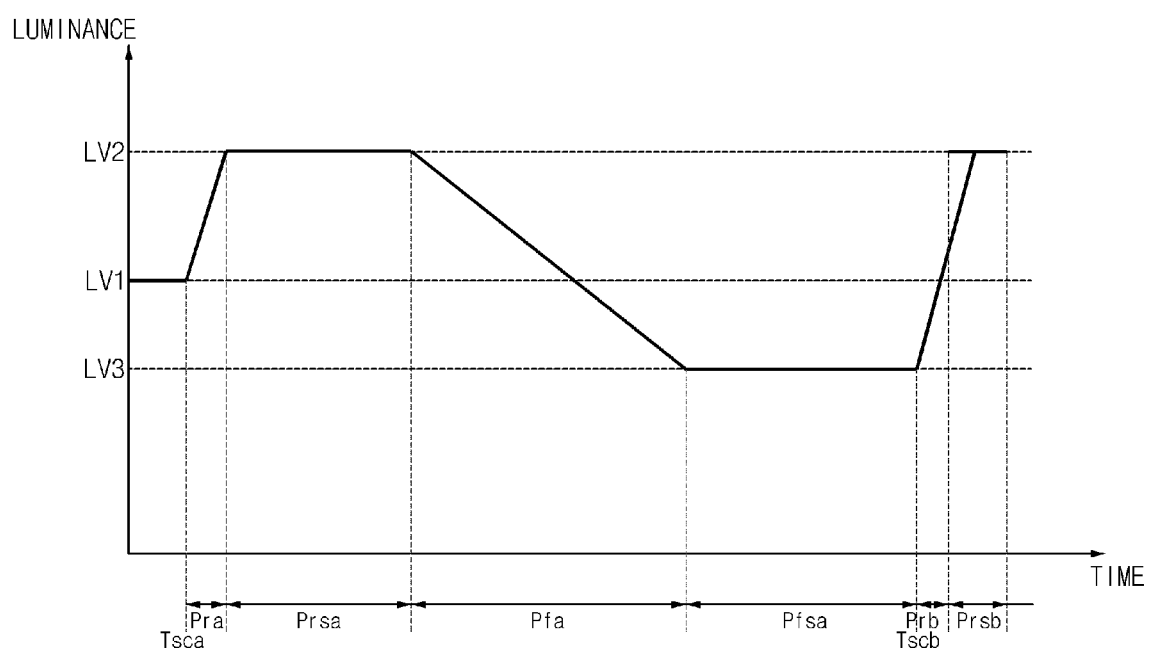

FIG. 10 is a diagram illustrating luminance change according to an embodiment of the present disclosure.

Referring to the figure, in the case in which the second image 720 of FIG. 7B is input in the state in which the first image 710 of FIG. 7A is displayed, the average picture level or the luminance of the second image 720 may be a first level.

Meanwhile, in the case in which the second image 720 having higher luminance than the first image 710 is input, the controller 170 may increase the luminance of the second image 720 during a first period Pra, and may decrease the luminance of the second image 720 after the first period Pra. Consequently, it is possible to prevent luminance decrease at the time of scene change of the input image during the first period Pra and to decrease the luminance of the second image 720 after the first period Pra, thereby preventing glare.

Alternatively, in the case in which the luminance difference between the second image 720 and the first image 710 is equal to or greater than a predetermined value, the controller 170 may increase the luminance of the second image 720 from a first level Lv1 to a second level Lv2 during the first period Pra. Consequently, it is possible to prevent luminance decrease at the time of scene change of the input image during the first period Pra.

Meanwhile, the controller 170 may maintain the luminance of the second image 720 at the second level Lv2 during a second period Prsa after the first period Pra.

Meanwhile, the controller 170 may decrease the luminance of the second image 720 from the second level Lv2 to a third level Lv3 during a third period Pfa after the second period Prsa. Consequently, it is possible to decrease the luminance of the second image 720 during the third period Pfa, thereby preventing glare.

Meanwhile, the controller 170 may maintain the luminance of the second image at the third level Lv3 during a fourth period Pfsa after the third period Pfa.

Meanwhile, the controller 170 may increase the luminance of the second image 720 from the third level Lv3 to the second level Lv2 during a fifth period Prb after the fourth period Pfsa. Consequently, it is possible to eliminate the total luminance change amount during the predetermined period.

Meanwhile, the controller 170 may perform control such that a luminance change rate at the time of luminance decrease of the second image 720 is lower than a luminance change rate at the time of luminance increase of the second image 720. Consequently, it is possible to slowly decrease luminance, thereby preventing glare.

Meanwhile, the third period Pfa may be longer than the first period Pra. Consequently, it is possible to slowly decrease luminance, thereby preventing glare.

Meanwhile, the second period Prsa may be longer than the first period Pra. Consequently, it is possible to maintain luminance increase at the time of scene change.

Figure 11:
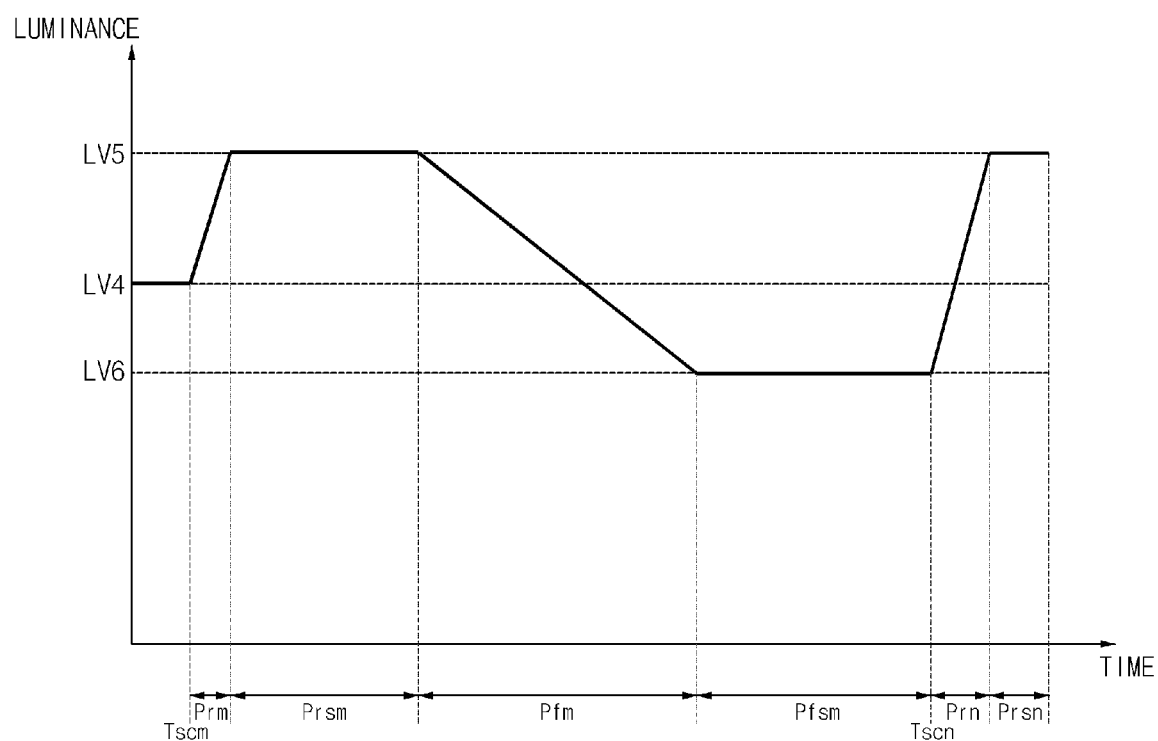

FIG. 11 is a diagram illustrating luminance change according to another embodiment of the present disclosure.

Referring to the figure, in the case in which a third image having higher luminance than the second image 720 of FIG. 7B is input in the state in which the first image 710 of FIG. 7A is displayed, the average picture level or the luminance of the third image may be a fourth level Lv4.

At this time, the fourth level Lv4 may be higher than the first level Lv1.

Meanwhile, in the case in which the third image having higher luminance than the first image 710 is input, the controller 170 may increase the luminance of the third image during a first period Prm, and may decrease the luminance of the third image after the first period Prm. Consequently, it is possible to prevent luminance decrease at the time of scene change of the input image during the first period Prm and to decrease the luminance of the third image after the first period Prm, thereby preventing glare.

Alternatively, in the case in which the luminance difference between the third image and the first image 710 is equal to or greater than a predetermined value, the controller 170 may increase the luminance of the third image from the fourth level Lv4 to a fifth level Lv5 during the first period Prm. Consequently, it is possible to prevent luminance decrease at the time of scene change of the input image during the first period Prm.

Meanwhile, the controller 170 may maintain the luminance of the third image at the fifth level Lv5 during a second period Prsm after the first period Prm.

Meanwhile, the controller 170 may decrease the luminance of the third image from the fifth level Lv5 to a sixth level Lv6 during a third period Pfm after the second period Prsm. Consequently, it is possible to decrease the luminance of the third image during the third period Pfm, thereby preventing glare.

Meanwhile, the controller 170 may maintain the luminance of the third image at the sixth level Lv6 during a fourth period Pfsm after the third period Pfm.

Meanwhile, the controller 170 may increase the luminance of the third image from the sixth level Lv6 to the fifth level Lv5 during a fifth period Prn after the fourth period Pfsm. Consequently, it is possible to eliminate the total luminance change amount during the predetermined period.

Meanwhile, the controller 170 may perform control such that a luminance change rate at the time of luminance decrease of the third image is lower than a luminance change rate at the time of luminance increase of the third image. Consequently, it is possible to slowly decrease luminance, thereby preventing glare.

Meanwhile, the third period Pfm may be longer than the first period Prm. Consequently, it is possible to slowly decrease luminance, thereby preventing glare.

Meanwhile, the second period Prsm may be longer than the first period Prm. Consequently, it is possible to maintain luminance increase at the time of scene change.

Meanwhile, in the case in which the luminance change amount of the image is increased, like the third image, the controller 170 may perform setting such that a luminance change rate at the time of luminance increase increases. Consequently, it is possible to reduce luminance decrease due to APL.

Figure 12:
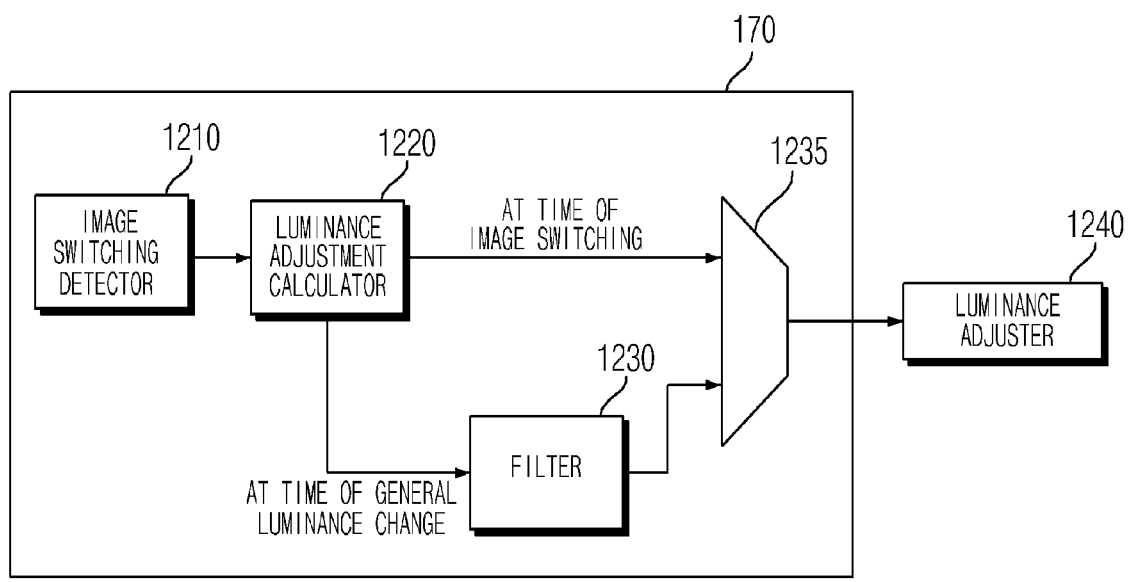

FIG. 12 is a block diagram of a controller 170 according to an embodiment of the present disclosure.

Referring to the figure, a controller 170 according to an embodiment of the present disclosure may include an image switching detector 1210 configured to detect image switching of an input image and a luminance adjustment calculator 1220 configured to perform luminance adjustment calculation at the time of detection of image switching by the image switching detector 1210. Consequently, it is possible to prevent luminance decrease at the time of scene change of the input image during a first period Pra and to decrease the luminance of a second image 720 after the first period Pra, thereby preventing glare.

Meanwhile, the display 180 may include a luminance adjuster 1240 configured to adjust luminance based on a luminance adjustment signal from the luminance adjustment calculator 1220. Consequently, it is possible to prevent luminance decrease at the time of scene change of the input image during the first period Pra and to decrease the luminance of the second image 720 after the first period Pra, thereby preventing glare.

The luminance adjuster 1240 may be provided in the timing controller 232 or the processor 270 of FIG. 5.

Meanwhile, in the case in which a second image 720 having higher luminance than the first image 710 is input after the first image 710, the luminance adjuster 1240 may increase the luminance of the second image 720 during the first period Pra, and may decrease the luminance of the second image 720 after the first period Pra. Consequently, it is possible to prevent luminance decrease at the time of scene change of the input image during the first period Pra and to decrease the luminance of the second image 720 after the first period Pra, thereby preventing glare.

Meanwhile, the controller 170 may include a filter 1230 configured to filter an input image in the case in which no image switching is detected by the image switching detector 1210 and an output interface 1235 configured to receive and output a signal from the image switching detector 1210 and a signal from the filter 1230. Consequently, it is possible to selectively prevent luminance decrease and glare.

Figure 13A:
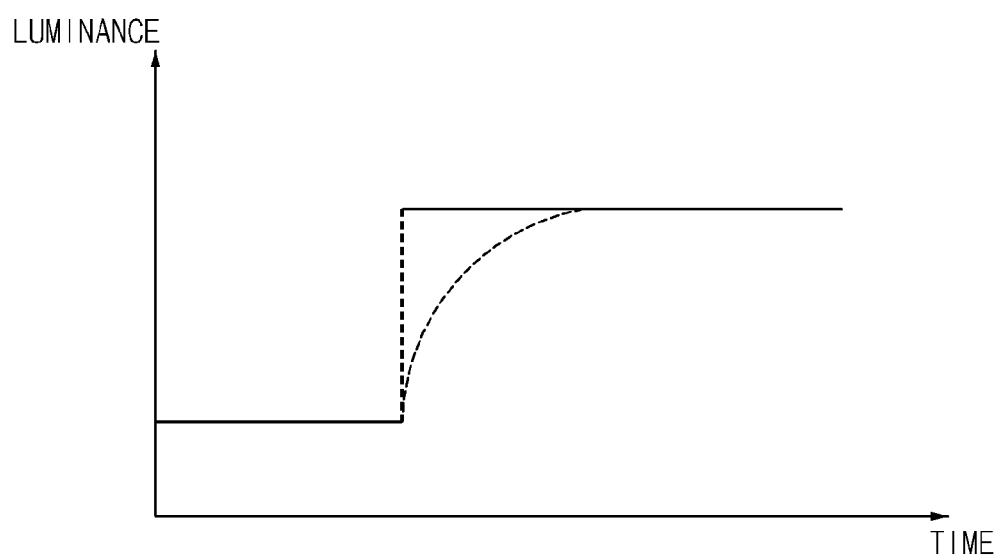
Figure 13B:
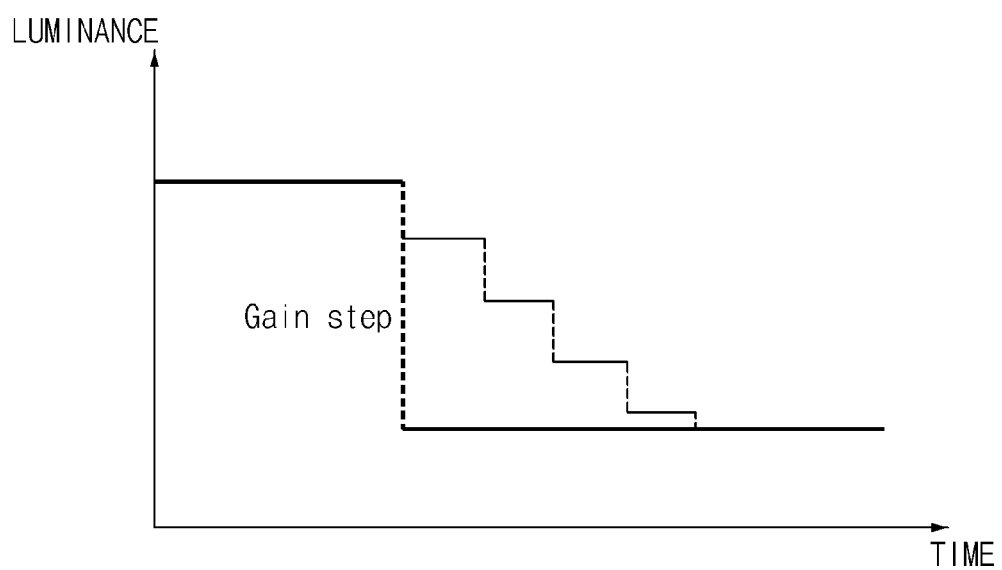

FIG. 13A illustrates an adaptive IIR filter, and FIG. 13B illustrates a step filter.

Each of the adaptive IIR filter of FIG. 13A and the step filter of FIG. 13B may be included in the filter 1230.

Meanwhile, an image display apparatus 100 according to another embodiment of the present disclosure may include a display 180 including an organic light emitting diode panel 210 and a controller 170 configured to control the display 180, wherein the controller 170 may perform control such that a first input image 710 is displayed, in the case in which the luminance difference between the first image 710 and a second image 720 input after the first image 710 is equal to or greater than a predetermined value, may increase the luminance of the second image 720 during a first period Pra, and may decrease the luminance of the second image 720 after the first period Pra. Consequently, it is possible to prevent luminance decrease at the time of scene change of the input image during the first period Pra and to decrease the luminance of the second image 720 after the first period Pra, thereby preventing glare.

Meanwhile, the controller 170 may increase the luminance of the second image 720 from a first level Lv1 to a second level Lv2 during the first period Pra, may maintain the luminance of the second image 720 at the second level Lv2 during a second period Prsa after the first period Pra, and may decrease the luminance of the second image 720 from the second level Lv2 to a third level Lv3 during a third period Pfa after the second period Prsa. Consequently, it is possible to prevent luminance decrease at the time of scene change of the input image during the first period Pra and to decrease the luminance of the second image 720 during the third period Pfa, thereby preventing glare.

An image display apparatus 100 according to a further embodiment of the present disclosure may include a display 180 including an organic light emitting diode panel 210 and a controller 170 configured to control the display 180, wherein the controller 170 may be configured to display a first input image 710, may insert a predetermined pattern into a second image 720 input after the first image 710, in the case in which the luminance of the second image 720 is higher than the luminance of the first image 710, may increase the luminance of the pattern in the second image 720 during a first period Pra, and may decrease the luminance of the pattern in the second image 720 after the first period Pra. Consequently, it is possible to prevent luminance decrease at the time of scene change of the input image during the first period Pra and to decrease the luminance of the second image 720 after the first period Pra, thereby preventing glare. This will be described with reference to FIGS. 14A to 14C.

Figure 14A:
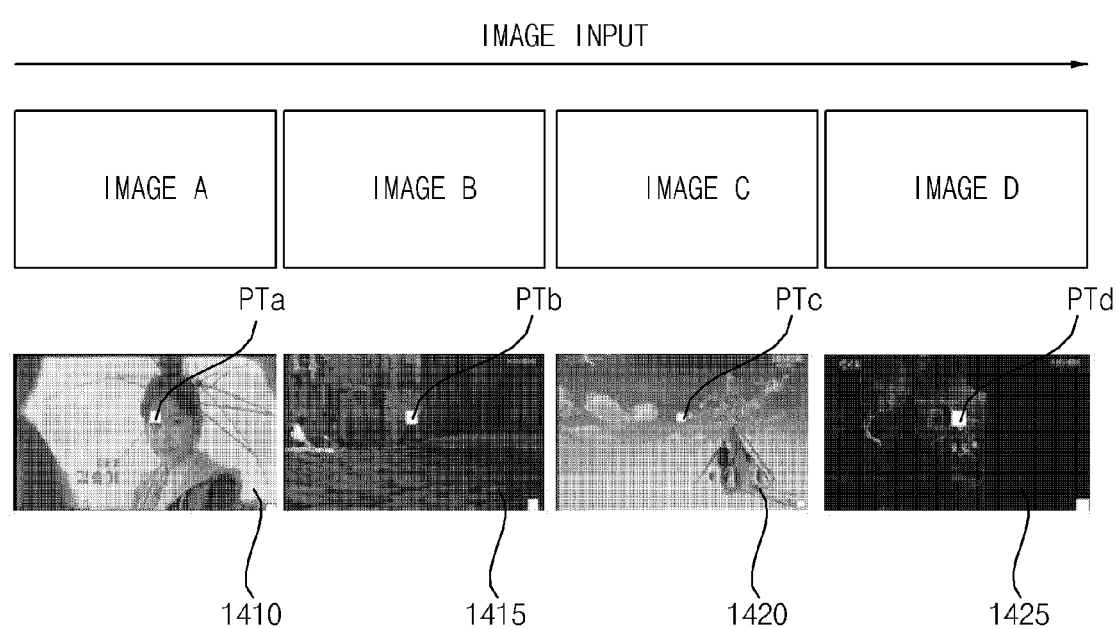
Figure 14B:
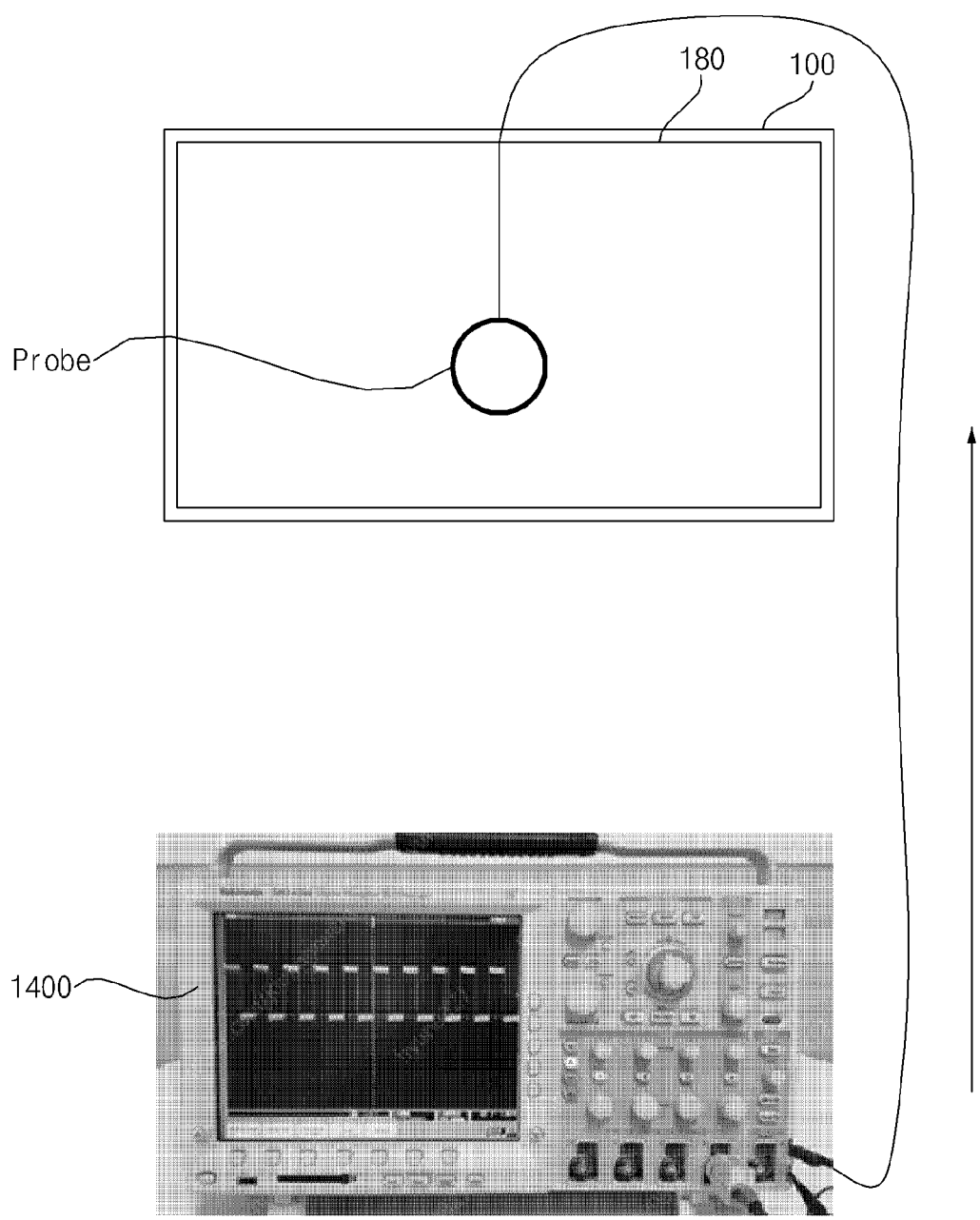
Figure 14C:
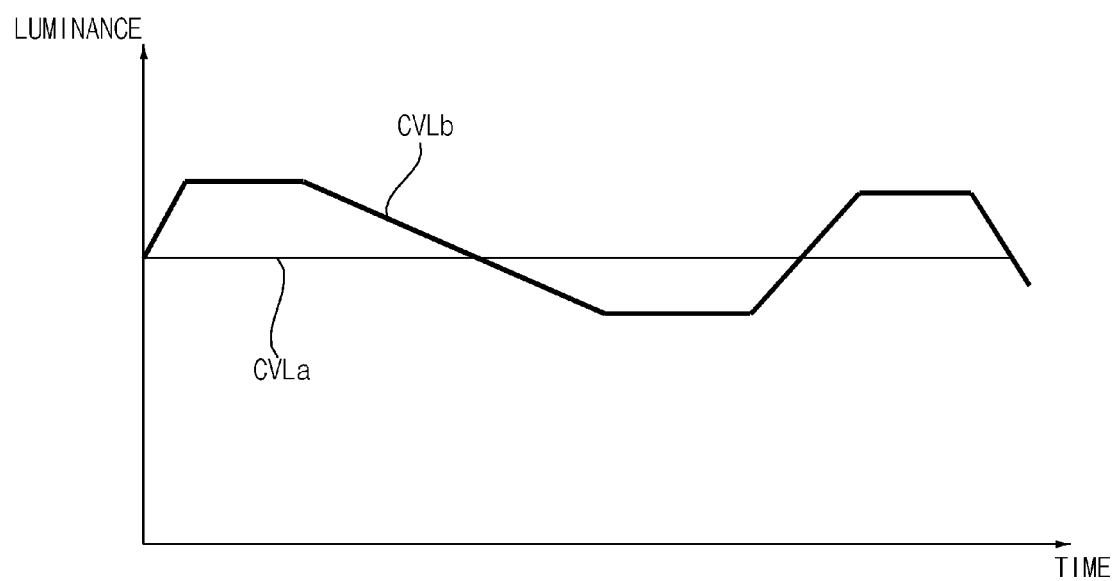

FIGS. 14A to 14C are diagrams describing that, after a pattern is inserted into an input image, luminance at the pattern insertion position is measured.

First, FIG. 14A illustrates that image A 1410 to image D 1425 are sequentially input.

Here, image A 1410 and image C 1420 are images having high luminance, and image B 1415 and image D 1425 are images having low luminance.

For luminance measurement, the controller 170 may insert or add pattern images PTa to PTd at specific patterns of image A 1410 to image D 1425.

As a result, the pattern images PTa to PTd are added to image A 1410 to image D 1425, respectively.

For example, in the case in which the luminance difference between image A 1410 and image B 1415 is equal to or greater than a predetermined value, i.e. in the case in which scene change is performed from a bright image to a dark image, the controller 170 may increase the luminance of image B from a first level to a second level during a first period, may maintain the luminance of image B at the second level during a second period after the first period, may decrease the luminance of image B to a third level during a third period after the second period, may maintain the luminance of image B at the third level during a fourth period after the third period, and may increase the luminance of image B to the second level during a fifth period.

Consequently, in the case in which the luminance of the pattern PTb in image B is measured using a probe of a luminance measurement instrument 1400, as shown in FIG. 14B, the luminance conversion curve CVLb of FIG. 14C may be obtained.

In the case in which the luminance difference between image A 1410 and image B 1415 is equal to or greater than the predetermined value, therefore, it is possible to prevent luminance decrease at the time of scene change of the input image and to prevent glare through luminance decrease.

As another example, in the case in which the luminance difference between image B 1415 and image C 1420 is equal to or greater than a predetermined value, i.e. in the case in which scene change is performed from a dark image to a bright image, the controller 170 may increase the luminance of image C from a first level to a second level during a first period, may maintain the luminance of image C at the second level during a second period after the first period, may decrease the luminance of image C to a third level during a third period after the second period, may maintain the luminance of image C at the third level during a fourth period after the third period, and may increase the luminance of image C to the second level during a fifth period.

Consequently, in the case in which the luminance of the pattern PTc in image C is measured using the probe of the luminance measurement instrument 1400, as shown in FIG. 14B, the luminance conversion curve CVLb of FIG. 14C may be obtained.

In the case in which the luminance difference between image B 1415 and image C 1420 is equal to or greater than the predetermined value, therefore, it is possible to prevent luminance decrease at the time of scene change of the input image and to prevent glare through luminance decrease.

As is apparent from the above description, an image display apparatus according to an embodiment of the present disclosure includes a display including an organic light emitting diode panel and a controller configured to control the display, wherein the controller is configured to display a first input image, in the case in which a second image having higher luminance than the first image is input after the first image, increase the luminance of the second image during a first period, and decrease the luminance of the second image after the first period. Consequently, it is possible to prevent luminance decrease at the time of scene change of the input image during the first period and to decrease the luminance of the second image after the first period, thereby preventing glare.

Meanwhile, in the case in which the luminance difference between the second image and the first image is equal to or greater than a predetermined value, the controller may increase the luminance of the second image from a first level to a second level during the first period, may maintain the luminance of the second image at the second level during a second period after the first period, and may decrease the luminance of the second image from the second level to a third level during a third period after the second period. Consequently, it is possible to prevent luminance decrease at the time of scene change of the input image during the first period and to decrease the luminance of the second image during the third period, thereby preventing glare.

Meanwhile, the controller may maintain the luminance of the second image at the third level during a fourth period after the third period, and may increase the luminance of the second image from the third level during a fifth period after the fourth period. Consequently, it is possible to eliminate the total luminance change amount during the predetermined period.

Meanwhile, the controller may perform control such that a luminance change rate at the time of luminance decrease of the second image is lower than a luminance change rate at the time of luminance increase of the second image. Consequently, it is possible to slowly decrease luminance, thereby preventing glare.

Meanwhile, the third period may be longer than the first period. Consequently, it is possible to slowly decrease luminance, thereby preventing glare.

Meanwhile, the second period may be longer than the first period. Consequently, it is possible to maintain luminance increase at the time of scene change.

Meanwhile, the controller may calculate the average picture level (APL) of an input image, and may change the luminance of the input image based on the average picture level. Consequently, it is possible to improve contrast.

Meanwhile, in the case in which the average picture level is equal to or higher than a reference level, the controller may decrease the luminance of the input image, as the average picture level increases. Consequently, it is possible to improve contrast.

Meanwhile, the controller may perform luminance conversion based on a first conversion table according to the average picture level of an input image, may perform luminance conversion based on a second conversion table having higher conversion luminance than the first conversion table during the first period when luminance is increased at the time of scene change between the first image and the second image, and may perform luminance conversion based on a third conversion table having lower conversion luminance than the first conversion table at the time of luminance decrease. Consequently, it is possible to prevent luminance decrease at the time of scene change.

Meanwhile, in the case in which a third image having higher luminance than the first image and higher luminance than the second image is input after the first image, the controller may increase the luminance of the third image during the first period and may decrease the luminance of the third image after the first period. Consequently, it is possible to prevent luminance decrease at the time of scene change of the input image during the first period and to decrease the luminance of the third image after the first period, thereby preventing glare.

Meanwhile, in the case in which a luminance difference between the third image and the first image is equal to or greater than a predetermined value, the controller may increase the luminance of the third image from a fourth level to a fifth level during the first period, may maintain the luminance of the third image at the fifth level during a second period after the first period, and may decrease the luminance of the third image from the fifth level to a sixth level during a third period after the second period. Consequently, it is possible to prevent luminance decrease at the time of scene change of the input image during the first period and to decrease the luminance of the third image after the third period, thereby preventing glare.

Meanwhile, the controller may maintain the luminance of the third image at the sixth level during a fourth period after the third period, and may increase the luminance of the third image from the sixth level during a fifth period after the fourth period. Consequently, it is possible to eliminate the total luminance change amount during the predetermined period.

Meanwhile, the controller may include an image switching detector configured to detect image switching of an input image and a luminance adjustment calculator configured to perform luminance adjustment calculation at the time of detection of image switching by the image switching detector. Consequently, it is possible to prevent luminance decrease at the time of scene change of the input image during the first period and to decrease the luminance of the second image after the first period, thereby preventing glare.

Meanwhile, the display may include a luminance adjuster configured to adjust luminance based on a luminance adjustment signal from the luminance adjustment calculator. Consequently, it is possible to prevent luminance decrease at the time of scene change of the input image during the first period and to decrease the luminance of the second image after the first period, thereby preventing glare.

Meanwhile, in the case in which a second image having higher luminance than the first image is input after the first image, the luminance adjuster may increase the luminance of the second image during the first period and may decrease the luminance of the second image after the first period. Consequently, it is possible to prevent luminance decrease at the time of scene change of the input image during the first period and to decrease the luminance of the second image after the first period, thereby preventing glare.

Meanwhile, the controller may include a filter configured to filter the input image in the case in which no image switching is detected by the image switching detector and an output interface configured to receive and output a signal from the image switching detector and a signal from the filter. Consequently, it is possible to selectively prevent luminance decrease and glare.

An image display apparatus according to another embodiment of the present disclosure includes a display including an organic light emitting diode panel and a controller configured to control the display, wherein the controller is configured to display a first input image, in the case in which the luminance difference between the first image and a second image input after the first image is equal to or greater than a predetermined value, increases the luminance of the second image during a first period, and decreases the luminance of the second image after the first period. Consequently, it is possible to prevent luminance decrease at the time of scene change of the input image during the first period and to decrease the luminance of the second image after the first period, thereby preventing glare.

Meanwhile, the controller may increase the luminance of the second image from a first level to a second level during the first period, may maintain the luminance of the second image at the second level during a second period after the first period, and may decrease the luminance of the second image from the second level to a third level during a third period after the second period. Consequently, it is possible to prevent luminance decrease at the time of scene change of the input image during the first period and to decrease the luminance of the second image during the third period, thereby preventing glare.

An image display apparatus according to a further embodiment of the present disclosure includes a display including an organic light emitting diode panel and a controller configured to control the display, wherein the controller is configured to display a first input image, insert a predetermined pattern into a second image input after the first image, in the case in which the luminance of the second image is higher than the luminance of the first image, increases the luminance of the pattern in the second image during a first period, and decreases the luminance of the pattern in the second image after the first period. Consequently, it is possible to prevent luminance decrease at the time of scene change of the input image during the first period and to decrease the luminance of the second image after the first period, thereby preventing glare.

Meanwhile, in the case in which the luminance difference between the second image and the first image is equal to or greater than a predetermined value, the controller may increase the luminance of the pattern in the second image from a first level to a second level during the first period, may maintain the luminance of the pattern in the second image at the second level during a second period after the first period, and may decrease the luminance of the pattern in the second image from the second level to a third level during a third period after the second period. Consequently, it is possible to prevent luminance decrease at the time of scene change of the input image during the first period and to decrease the luminance of the second image during the third period, thereby preventing glare.

Meanwhile, the controller may maintain the luminance of the pattern in the second image at the third level during a fourth period after the third period, and may increase the luminance of the pattern in the second image from the third level during a fifth period after the fourth period. Consequently, it is possible to eliminate the total luminance change amount during the predetermined period.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. An image display apparatus comprising:
a display comprising an organic light emitting diode panel; and
a controller configured to:
receive a first image,
cause the display to display the first image,
receive a second image having a higher luminance than the first image, wherein the second image is received by the controller after the first image,
increase luminance of the second image during a first period, and
decrease the luminance of the second image after the first period.

2. The image display apparatus of claim 1, wherein, based on a luminance difference between the first image and the second image being greater than or equal to a predetermined value:
the luminance of the second image is increased during the first period from a first level to a second level;
the luminance of the second image is maintained at the second level during a second period after the first period; and
the luminance of the second image is decreased from the second level to a third level during a third period after the second period.

3. The image display apparatus of claim 2, wherein the controller is further configured to:
maintain the luminance of the second image at the third level during a fourth period, wherein the fourth period occurs after the third period, and
increase the luminance of the second image during a fifth period occurring after the fourth period.

4. The image display apparatus of claim 3, wherein the third period is longer than the first period.

5. The image display apparatus of claim 3, wherein the second period is longer than the first period.

6. The image display apparatus of claim 1, wherein a luminance change rate at a time of luminance decrease of the second image is lower than a luminance change rate at a time of luminance increase of the second image.

7. The image display apparatus of claim 1, wherein the controller is further configured to determine an average picture level (APL) of an input image, and to change luminance of the input image based on the determined average picture level.

8. The image display apparatus of claim 7, wherein the controller is further configured to decrease the luminance of the input image as the determined average picture level increases based at least in part on the determined average picture level being greater than or equal to a reference level.

9. The image display apparatus of claim 1, wherein a luminance conversion is performed based on at least: a first conversion table according to an average picture level of an input image, a second conversion table having higher conversion luminance than the first conversion table during the first period when luminance is increased at a time of scene change between the first image and the second image, or a third conversion table having lower conversion luminance than the first conversion table at a time of luminance decrease.

10. The image display apparatus of claim 1, wherein based at least in part on a third image having higher luminance than the first image and the second image:
the luminance of a third image is increased during the first period, wherein the second image is input after the first image; and
the luminance of the third image is decreased after the first period.

11. The image display apparatus of claim 10, wherein based at least in part on a luminance difference between the third image and the first image being greater than or equal to a predetermined value:
the luminance of the third image is increased from a fourth level to a fifth level during the first period,
the luminance of the third image is maintained at the fifth level during a second period, wherein the second period occurs after the first period, and
the luminance of the third image is decreased from the fifth level to a sixth level during a third period, wherein the third period occurs after the second period.

12. The image display apparatus of claim 11, wherein the controller is further configured to:
maintain the luminance of the third image at the sixth level during a fourth period, wherein the fourth period occurs after the third period, and
increase the luminance of the third image from the sixth level during a fifth period, wherein the fifth period occurs after the fourth period.

13. The image display apparatus of claim 1, wherein the controller is further configured to:
detect image switching of an input image; and
perform luminance adjustment calculation at a time of detection of image switching.

14. The image display apparatus of claim 13, wherein the display is configured to adjust luminance based on a luminance adjustment signal according to the luminance adjustment calculation, and wherein the luminance of the second image increases during the first period, and the luminance of the second image decreases after the first period.

15. The image display apparatus of claim 13, wherein the controller comprises: a filter configured to filter the input image based at least in part on a determination that no image switching is detected by an image switching detector; and an output interface configured to receive and to output a signal from the image switching detector and a signal from the filter.

16. An image display apparatus comprising:
a display comprising an organic light emitting diode panel; and
a controller configured to control the display, wherein the controller is further configured to:
receive a first image,
cause the display to display the first image,
receive a second image having a higher luminance than the first image, wherein the second image is received by the controller after the first image,
increase luminance of the second image during a first period, and
decrease the luminance of the second image after the first period.

17. The image display apparatus of claim 16, wherein the controller is further configured to:
increase the luminance of the second image from a first level to a second level during the first period,
maintain the luminance of the second image at the second level during a second period, wherein the second period occurs after the first period, and
decrease the luminance of the second image from the second level to a third level during a third period, wherein the third period occurs after the second period.

18. An image display apparatus comprising:
a display comprising an organic light emitting diode panel; and a controller configured to control the display, wherein the controller is further configured to:

receive a first image, cause the display to display the first image, receive a second image, insert a predetermined pattern into the second image received after the first image based at least in part on luminance of the second image being higher than luminance of the first image, increase luminance of the pattern in the second image during a first period, and decrease the luminance of the pattern in the second image after the first period.

19. The image display apparatus of claim 18, wherein based at least in part on a luminance difference between the second image and the first image being greater than or equal to a predetermined value:

the luminance of the pattern in the second image is increased from a first level to a second level during the first period, the luminance of the pattern in the second image is maintained at the second level during a second period, wherein the second period occurs after the first period, and the luminance of the pattern is decreased in the second image from the second level to a third level during a third period, wherein the third period occurs after the second period.

20. The image display apparatus of claim 19, wherein the controller is further configured to:

maintain the luminance of the pattern in the second image at the third level during a fourth period, wherein the fourth period occurs after the third period, and increase the luminance of the pattern in the second image from the third level during a fifth period, wherein the fifth period occurs after the fourth period.

* * * * *